(12) United States Patent
Nishi et al.

(10) Patent No.: US 7,706,164 B2
(45) Date of Patent: Apr. 27, 2010

(54) INVERTER DEVICE

(75) Inventors: Shunsuke Nishi, Soraku-gun (JP); Takayoshi Urabe, Katsuragi (JP)

(73) Assignee: Sharp Kabushiki Kaisha, Osaka (JP)

( * ) Notice: Subject to any disclaimer, the term of this patent is extended or adjusted under 35 U.S.C. 154(b) by 833 days.

(21) Appl. No.: 10/594,120

(22) PCT Filed: Mar. 16, 2005

(86) PCT No.: PCT/JP2005/004622
§ 371 (c)(1),
(2), (4) Date: Sep. 25, 2006

(87) PCT Pub. No.: WO2005/091485
PCT Pub. Date: Sep. 29, 2005

(65) Prior Publication Data
US 2007/0177338 A1 Aug. 2, 2007

(30) Foreign Application Priority Data
Mar. 24, 2004 (JP) .............................. 2004-087453

(51) Int. Cl.
*H02M 1/00* (2007.01)
(52) U.S. Cl. ...................... 363/146; 363/131; 323/906
(58) Field of Classification Search .................. 315/86, 315/160, 165; 363/146, 132, 131, 123, 13; 323/906; 307/43, 64, 66, 151
See application file for complete search history.

(56) References Cited
U.S. PATENT DOCUMENTS
6,761,581 B2 * 7/2004 Takehara et al. ............. 439/218

7,079,406 B2 * 7/2006 Kurokami et al. ........ 363/56.03
7,177,168 B2 * 2/2007 Toyomura et al. ........... 363/131
2002/0044473 A1 4/2002 Toyomura et al.
2002/0186020 A1 12/2002 Kondo et al.
2004/0151011 A1 8/2004 Toyomura et al.
2004/0157506 A1 8/2004 Kondo et al.

FOREIGN PATENT DOCUMENTS

| JP | 5-176552 A | 7/1993 |
|---|---|---|
| JP | 5-72066 U | 9/1993 |
| JP | 7-231657 A | 8/1995 |
| JP | 9-135577 | 5/1997 |
| JP | 2001-238464 | 8/2001 |
| JP | 2002-142460 | 5/2002 |
| JP | 2002-354678 | 12/2002 |

* cited by examiner

*Primary Examiner*—Douglas W Owens
*Assistant Examiner*—Ephrem Alemu
(74) *Attorney, Agent, or Firm*—Nixon & Vanderhye P.C.

(57) ABSTRACT

An inverter device, which has two operation modes including a grid-connected operation mode where the inverter device is interconnected with a commercial power system, and an isolated operation mode where the inverter device is independent of a commercial power system and performs an isolated operation, includes an inverter converting direct-current power received from a direct-current power supply of a solar battery array into alternating-current power, a control unit controlling an action of an inverter device, a plug for outputting the alternating-current power converted by the inverter, and a load-connecting receptacle on a path of a power supply line connecting the inverter and the plug, for outputting the alternating-current power.

20 Claims, 2 Drawing Sheets

INVERTER DEVICE

This application is the US national phase of international application PCT/JP2005/004622 filed 16 Mar. 2005, which designated the U.S. and claimed priority of JP 2004-087453 filed 24 Mar. 2004, the entire contents of each of which are hereby incorporated by reference.

TECHNICAL FIELD

The present invention relates to an inverter device, and particularly to an inverter device converting direct-current power of a direct-current power supply such as a solar battery, a storage battery, or an electric generator into alternating-current power for outputting the same, and having two modes including a grid-connected operation mode where the inverter device is interconnected with a commercial power system or an isolated operation mode where the inverter device is independent of the commercial power system and performs an isolated operation.

BACKGROUND ART

Conventionally, a decentralized power supply grid-connected with a commercial power system by using an inverter device has been developed for practical use. In such a power supply system, an inverter device converts direct-current power of a direct-current power supply such as a solar battery, a storage battery, or an electric generator into alternating-current power, and supplies the converted alternating-current power to each household electrical appliance (household load). If power output from the inverter device is less than power to be consumed by the household load, power is purchased from a power company by allowing power to flow from a commercial power system to cover a shortage of power. In contrast, if power output from the inverter device exceeds power to be consumed by the household load, it is also possible to sell power to the power company by allowing power to flow to the commercial power system. As such, an operation mode of the inverter device in which the inverter device is interconnected with the commercial power system and supplies power to the load is referred to as a "grid-connected operation mode".

As to the inverter device as described above, when one wishes to use the inverter device as an emergency power supply or an independent power supply in the case where some failure occurs in the commercial power system owing to power outage or the like, some inverter devices can be disconnected from the commercial power system so that only the power output from the inverter devices can be supplied to some load (isolated load) connected to a dedicated receptacle. As such, an operation mode of the inverter device in which the inverter device is independent of the commercial power system and supplies power to the load is referred to as an "isolated operation mode".

A conventional inverter device in the case where a solar battery is used as a direct-current power source will be described with reference to FIG. 5.

FIG. 5 is a functional block diagram showing a configuration of a decentralized power supply system using a conventional inverter device.

An inverter device 102 includes a converter 103, an inverter 104, a filter 105, a protection relay 106, an interconnection relay 107, a control unit 108, and an isolated relay 116. Control unit 108 is also controlled by a signal from outside, such as from a remote controller 109.

A voltage of direct-current power from a solar battery array 101 is boosted by converter 103. The direct-current power, whose voltage is boosted, is converted into alternating-current power in inverter 104. A harmonic component of the converted alternating-current power is smoothed in filter 105. In the grid-connected operation mode, the alternating-current power converted in inverter device 102 is supplied to a household load (not shown) in a manner interconnecting with a commercial power system 114. At that time, isolated relay 116 is brought into a non-conduction state, while each of protection relay 106 and interconnection relay 107 is brought into a conduction state.

In contrast, in the isolated operation mode, either of protection relay 106 and interconnection relay 107 are brought into a non-conduction state, and isolated relay 116 is brought into a conduction state, so that inverter device 102 is disconnected from commercial power system 114. Accordingly, the alternating-current power converted in inverter device 102 is supplied from a dedicated, isolated load connecting extension receptacle 110 to the isolated load.

As described above, in the conventional inverter device 102, a power supply line for alternating-current power output from inverter 104 is provided for each of the grid-connected operation and the isolated operation (see Patent Document 1 and Patent Document 2).

Patent Document 1: Japanese Patent Laying-Open No. 9-135577

Patent Document 2: Japanese Patent Laying-Open No. 2001-238464

In the conventional inverter device 102 as described above, interconnection relay 107 which allows alternating-current power output from inverter 104 to be in a conduction state/non-conduction state in the grid-connected operation mode, and isolated relay 116 which allows alternating-current power output from inverter 104 to be in a conduction state/non-conduction state in the isolated operation mode, are provided in parallel. It was therefore difficult to reduce the dimension of a body of inverter device 102.

Furthermore, in Patent Document 1, an output terminal for outputting alternating-current power converted by inverter 104 in the isolated operation mode is provided at a body surface of inverter device 102. Therefore, when one wishes to use a load at a place remote from inverter device 102, one inevitably has to connect dedicated, isolated load connecting extension receptacle 110 thereto.

An aspect of the present invention is made to solve such a problem above. An object of the present invention is to provide an inverter device performing a grid-connected operation with an output plug inserted into a household receptacle, the inverter device allowing the output plug and a load-connecting receptacle for the isolated operation to be used with a simple configuration.

SUMMARY

An inverter device according to an aspect of the present invention is an inverter device having two operation modes including a grid-connected operation mode where the inverter device is interconnected with a commercial power system, and an isolated operation mode where the inverter device is independent of the commercial power system and performs an isolated operation, includes: an inverter unit converting direct-current power received from a direct-current power supply into alternating-current power; a control unit controlling an action of the inverter device; a grid-connected output terminal for outputting the alternating-current power converted by the inverter unit; and an isolated operation output terminal provided on a path of a power supply line connecting the inverter unit and the grid-connected output terminal, for outputting the alternating-current power. The grid-connected output terminal is a plug connectable to a commercial receptacle, commercial power from the commercial power system being supplied to the commercial receptacle. The isolated operation output terminal is a receptacle a load is connectable to, the load being supplied with the alternating-current power.

Preferably, the inverter device further includes a switch unit provided between the isolated operation output terminal and the grid-connected output terminal on the path of the power supply line. The control unit brings the switch unit into a non-conduction state when the grid-connected operation mode is terminated.

Preferably, the inverter device further includes a manipulation unit capable of transmitting to the control unit a signal for instructing a start of an operation of the inverter unit. In a case where the control unit receives the signal from the manipulation unit in the isolated operation mode, when the switch unit is in the non-conduction state, the control unit permits the operation of the inverter unit.

Preferably, the inverter device further includes a current detecting unit provided between the inverter unit and the isolated operation output terminal on the path of the power supply line, for detecting whether or not a current flows therebetween. The control unit operates the inverter unit for a prescribed period of time when the control unit brings the switch unit into the non-conduction state, and the control unit continues an operation of the inverter unit when the current detecting unit detects that the current flows for the prescribed period of time.

Preferably, the inverter device further includes a housing having the grid-connected output terminal and the isolated operation output terminal integrally provided therein. The housing includes a plug accommodating unit capable of accommodating the grid-connected output terminal.

Preferably, the inverter device further includes a manipulation unit capable of transmitting to the control unit a signal for instructing a start of an operation of the inverter unit. The plug accommodating unit has a plug accommodation detecting unit detecting whether or not the grid-connected output terminal is accommodated in the plug accommodating unit. In a case where the control unit receives the signal from the manipulation unit in the isolated operation mode, when the plug accommodation detecting unit detects that the grid-connected output terminal is accommodated in the plug accommodating unit, the control unit permits the operation of the inverter unit.

Preferably, the inverter device further includes a current detecting unit provided between the inverter unit and the isolated operation output terminal on the path of the power supply line, for detecting whether or not a current flows therebetween. The control unit operates the inverter unit for a prescribed period of time when the plug accommodation detecting unit detects that the grid-connected output terminal is accommodated in the plug accommodating unit, and the control unit continues the operation of the inverter unit when the current detecting unit detects that the current flows for the prescribed period of time.

According to an embodiment of the present invention, a grid-connected output terminal and an isolated operation output terminal are both provided at a common power supply line, and hence the configuration of the inverter device becomes simple, which makes it possible to downsize the body of the inverter device. Furthermore, in the inverter device according to an embodiment of the present invention, the isolated operation output terminal is a receptacle to which the load is connectable, which makes it possible to improve usability.

Figure 1:
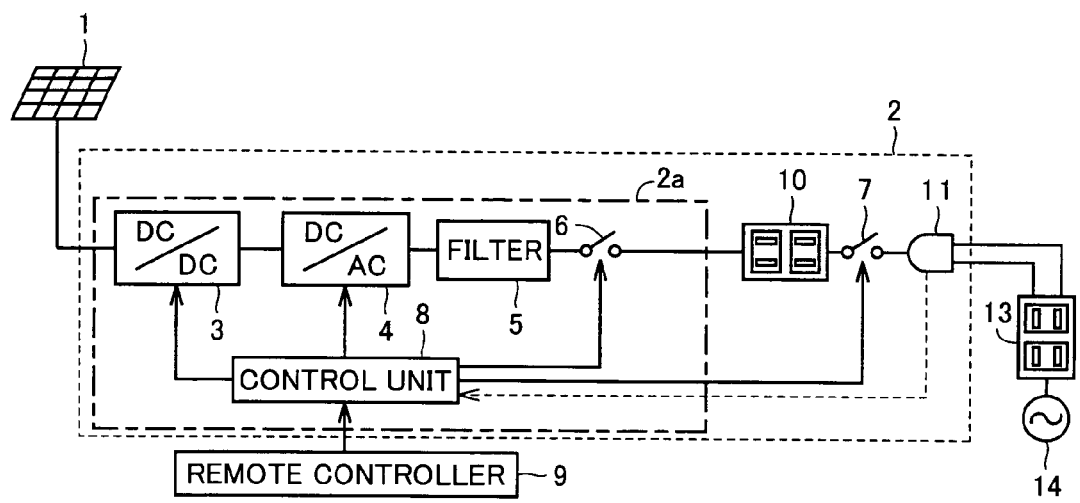
FIG. 1 is a functional block diagram showing a configuration of a decentralized power supply system using an inverter device according to a first embodiment of the present invention.

DESCRIPTION OF THE REFERENCE SIGNS 1, 101: solar battery array, 2, 102: inverter device, 2a: power converting unit, 3, 103: converter, 4, 104: inverter, 5, 105: filter, 6, 106: protection relay, 7, 107: interconnection relay, 8, 108: control unit, 9, 109: remote controller, 10: load-connecting receptacle, 11: plug, 12: plug accommodating module, 13: household receptacle, 14, 114: commercial power system, 15: output relay, 20: housing, 21: current detecting unit, 22: isolated load, 31: plug rotary shaft, 32: groove unit (slider), 33: plug accommodating unit, 34: spring, 35: plug accommodation detecting switch, 110: isolated load connecting extension receptacle, 116: isolated relay.

DETAILED DESCRIPTION

The embodiments of the present invention will hereinafter be described in detail with reference to the drawings. The same or corresponding portions in the drawings are denoted by the same reference characters, and the description thereof will not be repeated.

First Embodiment

FIG. 1 is a functional block diagram showing a configuration of a decentralized power supply system using an inverter device according to a first embodiment of the present invention.

An inverter device 2 in the first embodiment has two operation modes including a grid-connected operation mode where the inverter device is interconnected with a commercial power system 14, or an isolated operation mode where the inverter device is independent of commercial power system 14 and performs an isolated operation.

Referring to FIG. 1, inverter device 2 in the first embodiment includes a converter 3, an inverter 4, a filter 5, a protection relay 6, an interconnection relay 7, a control unit 8, a load-connecting receptacle 10, and a plug 11. In inverter device 2, converter 3, inverter 4, filter 5, protection relay 6, and control unit 8 are collectively referred to as a power converting unit 2a.

Converter 3 is a DC-DC converter, and boosts a voltage of direct-current power output from a solar battery array 1 serving as a direct-current power supply. Because of the fluctuations in a system voltage, converter 3 is controlled to assuredly provide a direct-current voltage of at least a peak value of the system voltage. For example, if a household receptacle 13 has a 100 V system voltage, its peak value is approximately 141 V. In this case, converter 3 is controlled to provide an output voltage of at least 150 V. In the first embodiment, a DC-DC converter is used as a boosting device. However, a boosting chopper or the like may be used. Furthermore, if an output voltage from solar battery array 1 is always at a value equal to or above a peak value of the system voltage, a boosting device such as converter 3 may be omitted.

Inverter 4 converts the direct-current power, whose voltage is boosted by converter 3, into alternating-current power through pulse width modulation control. Inverter 4 has full-bridged four switching elements, and each of the switching elements has a diode connected in inverse-parallel therewith. The configuration of inverter 4 is not limited thereto, and may be other configurations.

Filter 5 smoothes a radiofrequency pulse generated through a switching action in inverter 4 to provide a sinusoidal current. Filter 5 includes a reactor and a capacitor.

Protection relay 6 is provided in series between filter 5 and load-connecting receptacle 10 on a path of the power supply line. Protection relay 6 is brought into a conduction state/non-conduction state through protective coordinated control by control unit 8, which will be described later. When inverter 4 is operated and protection relay 6 is in a conduction state, inverter device 2 outputs alternating-current power. In contrast, even when inverter 4 is operated, if protection relay 6 is in a non-conduction state, inverter device 2 stops outputting alternating-current power.

Interconnection relay 7 is provided in series between load-connecting receptacle 10 and plug 11 on the path of the power supply line. Interconnection relay 7 is brought into a conduction state/non-conduction state by control unit 8, depending on whether the grid-connected operation mode is adopted or not. If the grid-connected operation mode is adopted, interconnection relay 7 is brought into a conduction state. In contrast, if the isolated operation mode is adopted, interconnection relay 7 is brought into a non-conduction state.

Control unit 8 controls a gate pulse width signal to be supplied to a drive circuit for driving a switching element (e.g. an insulated gate bipolar transistor (IGBT), a metal oxide semiconductor field effect transistor (MOS-FET) and the like) in converter 3 and inverter 4, monitors an input voltage, an input current, an output current, and a system voltage, and controls protection relay 6 and interconnection relay 7. Generally, a current control scheme is adopted in the grid-connected operation mode, while a voltage control scheme is adopted in the isolated operation mode. The current control scheme means that an output current of inverter device 2 is subjected to feedback control such that the output current takes a target current value. The voltage control scheme means that the output voltage of inverter device 2 is subjected to feedback control such that the output voltage is equal to a voltage reference value.

Control unit 8 also provides protective coordinated control to inverter device 2, to prevent an islanding operation and provide protection against an abnormal event of the system such as an increase/decrease in system voltage, or an increase/decrease in system frequency. The islanding operation means that even in the case of power outage on commercial power system 14 side, the power outage is not detected, and that inverter device 2 is still operated in the grid-connected operation mode. Furthermore, control unit 8 receives from and transmits to a remote controller 9 various kinds of signals, to manage and control inverter device 2.

Remote controller 9 is a manipulation unit capable of transmitting a signal from outside of inverter device 2 to control unit 8, by being manipulated by a user. For example, remote controller 9 can select switching to an operation/stop of inverter device 2, the grid-connected operation mode/isolated operation mode, and others. A signal selected by the user operating remote controller 9 is transmitted to control unit 8, and control unit 8 controls inverter device 2 in accordance with a content indicated by the received signal. The manipulation unit that can be manipulated by the user is not limited to externally-provided one such as remote controller 9, and may be one provided at inverter device 2.

Load-connecting receptacle 10 is a receptacle, which is provided between power converting unit 2a and interconnection relay 7 on the path of the power supply line, and to which a load is directly connectable. Load-connecting receptacle 10 is an isolated operation output terminal that is not interconnected with commercial power system 14, and supplies power to the load by exclusively using the alternating-current power converted by power converting unit 2a. As such, the load connected to load-connecting receptacle 10 is referred to as an isolated load.

Plug 11 is a plug connectable to household receptacle 13 to which commercial power is supplied from commercial power system 14. Plug 11 is a grid-connected output terminal for supplying power through plug 11 to a household load and/or commercial power system 14. The household load refers to household electrical appliances collectively, and is activated by receiving alternating-current power from the decentralized power supply composed of solar battery array 1 and inverter device 2. When power to be consumed exceeds power supplied from the decentralized power supply, the household load is also supplied with alternating-current power from commercial power system 14.

Control of inverter device 2 in the grid-connected operation mode will be described with reference to FIG. 1.

In the grid-connected operation mode, protection relay 6 and interconnection relay 7 are brought into a conduction state. By providing such control, alternating-current power converted by power converting unit 2a is output from plug 11. Furthermore, when a certain load is connected to load-connecting receptacle 10 provided on a cord of plug 11, the alternating-current power is also output from load-connecting receptacle 10. The alternating-current power output from plug 11 is supplied through household receptacle 13 to the household load (not shown) and commercial power system 14.

When the grid-connected operation mode is terminated, control unit 8 brings interconnection relay 7 into a non-conduction state. By doing so, it is possible to switch to the isolated operation in a safe manner. Furthermore, it is possible to prevent a user or the like from receiving an electric shock by touching of plug 11.

Control of inverter device 2 in the isolated operation mode will now be described with reference to FIG. 1.

In the isolated operation mode, protection relay 6 is brought into a conduction state, and interconnection relay 7 is brought into a non-conduction state. By providing such control, inverter device 2 is shut off from commercial power system 14. Accordingly, the alternating-current power converted by power converting unit 2a is not output from plug 11, and is output from load-connecting receptacle 10. The alternating-current power output from load-connecting receptacle 10 is supplied to the isolated load (not shown) connected to load-connecting receptacle 10.

Even if control unit 8 receives a signal for starting the isolated operation mode by the user's operation of remote controller 9, control unit 8 never starts outputting the alternating-current power until it senses that interconnection relay 7 is brought into a non-conduction state.

By doing so, even when the isolated operation mode is selected with plug 11 inserted into household receptacle 13, it is possible to prevent a user from receiving an electric shock by touching of plug 11 subsequently. Even when plug 11 is removed from household receptacle 13, if interconnection relay 7 is still in a conduction state, the alternating-current power converted by inverter 4 is also supplied to plug 11. Therefore, by bringing interconnection relay 7 into a non-conduction state, it is possible to prevent a user from receiving an electric shock by touching of plug 11. Furthermore, when power outage occurs for some reason in commercial power system 14 during a grid-connected operation, an output of alternating-current power from inverter device 2 is stopped. By providing such control, it is possible to prevent a recovery worker from suffering an electric shock accident owing to system charge. In the case where the isolated operation mode is started with interconnection relay 7 being in a conduction state, even if the system, in which power outage occurs because of a failure, is recovered, a waveform from the inverter device 2 is not in synchronization with an actual system voltage waveform, which may cause a failure in inverter device 2. However, the above-described control is provided in the present embodiment, and hence such a failure in inverter device 2 can be prevented.

In the first embodiment, plug 11 may include a voltage detecting unit using a transformer, an isolation amplifier or the like. Referring to FIG. 1, when plug 11 is inserted into household receptacle 13, the voltage detecting unit detects a system voltage, and transmits the detected signal to control unit 8 as shown by a dotted line. Control unit 8 monitors the signal, and thereby brings interconnection relay 7 into a conduction state if the system voltage is normal, and brings interconnection relay 7 into a non-conduction state if the system voltage is abnormal. By doing so, it is possible to switch between the grid-connected mode and the isolated operation mode in a safe manner.

Alternatively, interconnection relay 7 may be controlled by a user's manipulation of remote controller 9. For example, interconnection relay 7 is brought into a non-conduction state if a user selects a stop of the grid-connected operation mode, and interconnection relay 7 is brought into a conduction state if a user selects a start of the grid-connected operation mode.

Figure 2:
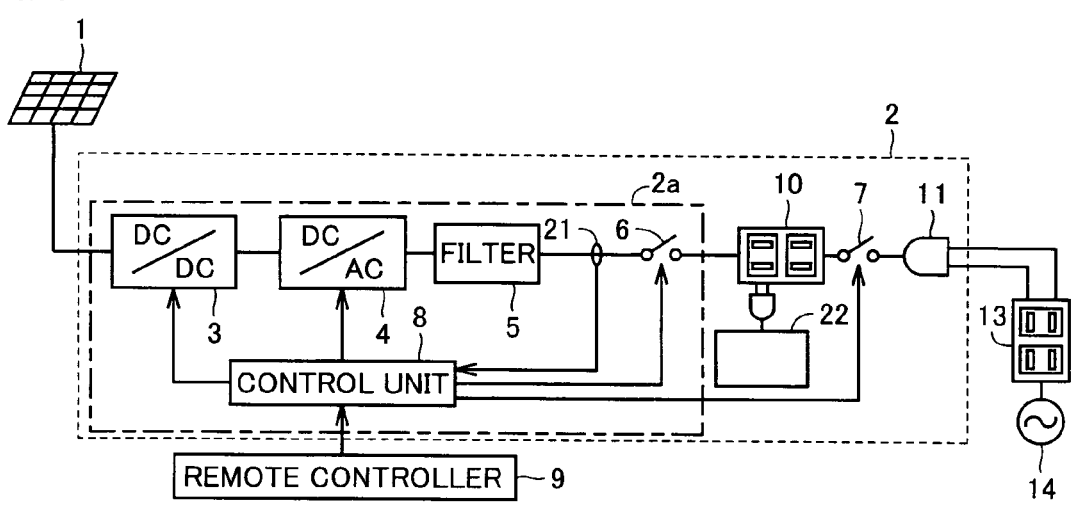
FIG. 2 is a functional block diagram showing a configuration in which a current detecting unit is provided at the inverter device according to the first embodiment of the present invention.

FIG. 2 is a functional block diagram showing a configuration in which a current detecting unit is provided at the inverter device according to the first embodiment of the present invention.

Referring to FIG. 2, a current detecting unit 21 is provided between filter 5 and protection relay 6. For current detecting unit 21, a shunt resistor or the like is used. Current detecting unit 21 detects an output current of the alternating-current power converted by inverter 4 and output through filter 5. Control unit 8 monitors the output current detected by current detecting unit 21.

When the grid-connected operation mode is stopped by power outage, a manipulation of remote controller 9 or the like, control unit 8 brings interconnection relay 7 into a non-conduction state, as described above. Subsequently, control unit 8 operates inverter 4 for a short period of time (e.g. one second). If isolated load 22 is connected to load-connecting receptacle 10, current detecting unit 21 detects an extremely small amount of current. Accordingly, if current detecting unit 21 detects a current, it is recognized that isolated load 22 is connected, and hence an operation of inverter 4 is continued. If current detecting unit 21 does not detect a current, it is recognized that isolated load 22 is not connected, and hence the operation of inverter 4 is stopped. With such a configuration, even if power outage occurs in commercial power system 14 because of some failure, inverter 4 is automatically operated, and hence power can immediately be supplied to isolated load 22.

Figure 5:
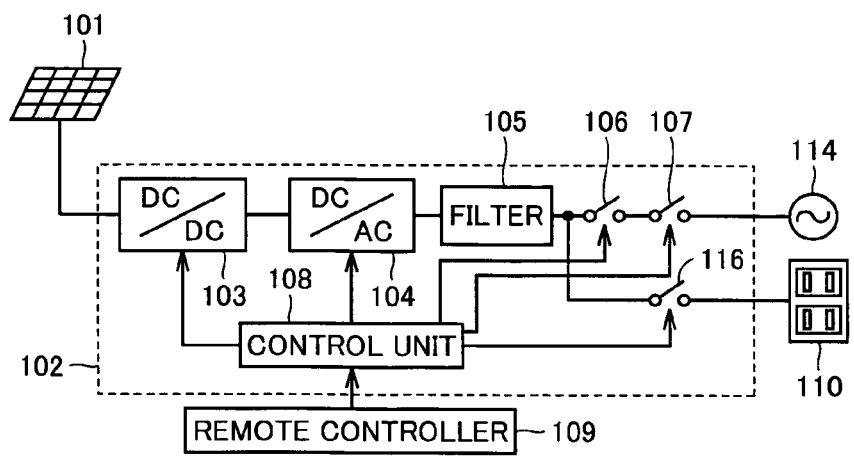
FIG. 5 is a functional block diagram showing a configuration of a decentralized power supply system using a conventional inverter device.

According to the configuration in the first embodiment, plug 11 and load-connecting receptacle 10 are provided in parallel on the common power supply line, and hence a configuration of inverter device 2 becomes simple. When compared with the conventional inverter device 102 (see FIG. 5), interconnection relay 7 is configured to serve as interconnection relay 107 and isolated relay 116. It is therefore possible to reduce the number of relays and hence the cost. Furthermore, an output terminal for supplying power to the isolated load in the isolated operation mode corresponds to load-connecting receptacle 10 to which a load is directly connectable, and hence usability can be improved. Furthermore, load-connecting receptacle 10 is provided on the path of the power supply line connecting power converting unit 2a and plug 11, and hence there may be a case where the trouble of using an extension receptacle is eliminated, which can improve usability.

Second Embodiment

Figure 3:
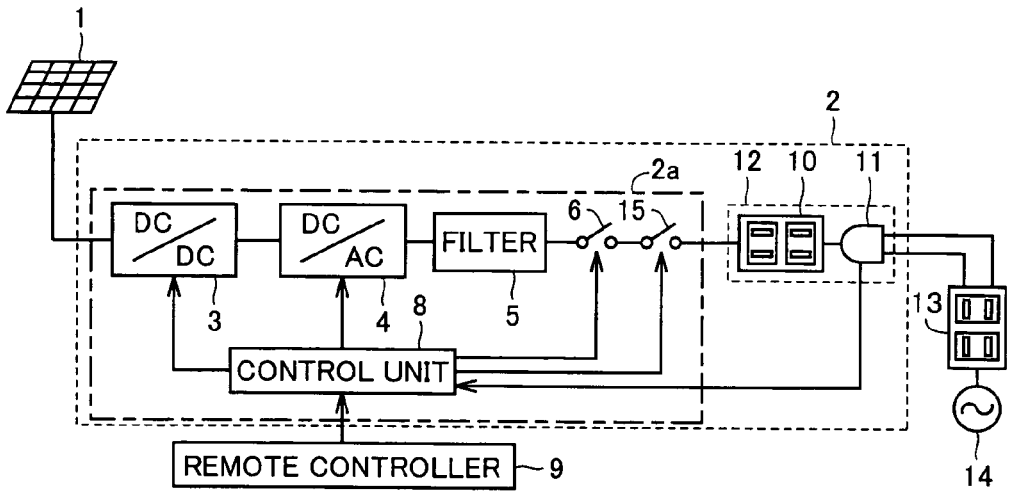
FIG. 3 is a functional block diagram showing a configuration in which a current detecting unit is provided at the inverter device according to the second embodiment of the present invention.

FIG. 3 is a functional block diagram showing a configuration of a decentralized power supply system using an inverter device according to a second embodiment of the present invention.

Referring to FIG. 3, in the second embodiment, load-connecting receptacle 10 and plug 11 are integrated to configure a plug accommodating module 12 capable of accommodating plug 11 therein.

When compared with the first embodiment, interconnection relay 7 does not exist between load-connecting receptacle 10 and plug 11, and an output relay 15 is provided between protection relay 6 and load-connecting receptacle 10. Output relay 15 is for controlling an output itself of inverter device 2 by being brought into a conduction/non-conduction state. Other configurations are similar to those in the first embodiment.

Plug accommodating module 12 will be described in detail with reference to FIGS. 4A and 4B.

Figure 4A:
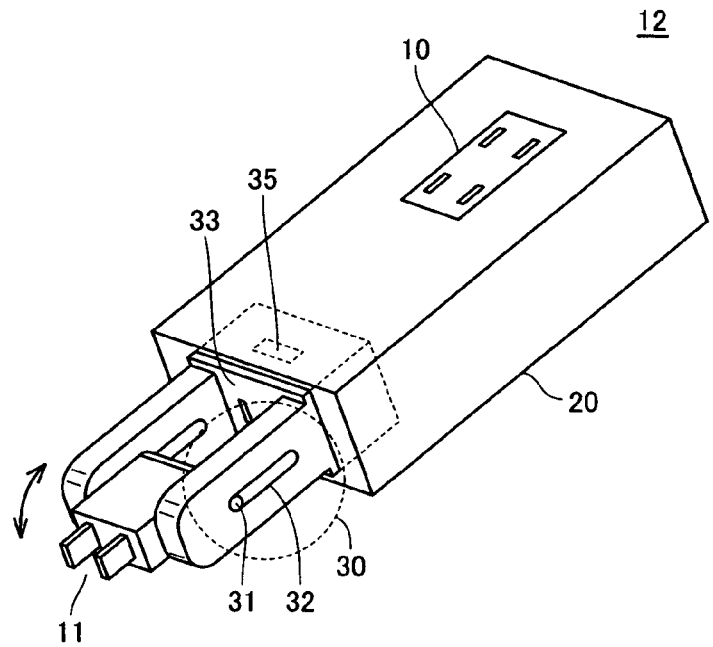
FIG. 4A is an external view of a plug accommodating module provided at an inverter device according to a second embodiment of the present invention.

FIG. 4A is an external view of plug accommodating module 12 provided at inverter device 2 in the second embodiment of the present invention. FIG. 4B is a partial enlarged view of a part shown by 30 in FIG. 4A.

Referring to FIG. 4A, a housing 20 of plug accommodating module 12 has a load-connecting receptacle 10 at its surface. Plug 11 is configured such that plug 11 is rotated and thereby accommodated in a plug accommodating unit 33 in housing 20. Referring to FIG. 4B, a plug rotary shaft 31 provided at the opposite ends of plug 11 rotates plug 11 by sliding groove portion 32. As such, plug 11 can be accommodated in plug accommodating unit 33. Reference numeral 34 in FIG. 4B denotes a spring.

Referring to FIG. 4A again, a plug accommodation detecting switch 35 sensing that plug 11 is accommodated in plug accommodating unit 33 is provided at the back of plug accommodating unit 33. Plug accommodation detecting switch 35 is turned on when plug 11 is completely accommodated. When control unit 8 receives from plug accommodation detecting switch 35 a signal indicating that plug 11 is accommodated in plug accommodating unit 33, control unit 8 permits the isolated operation mode.

By providing such control, it is possible to prevent a user from receiving an electric shock by touching of plug 11 after inverter device 2 starts the isolated operation mode.

Alternatively, as in the first embodiment, a current detecting unit (see FIG. 2) may be provided between filter 5 and protection relay 6. When control unit 8 detects from plug accommodation detecting switch 35 that plug 11 is accommodated in plug accommodating unit 33, control unit 8 operates inverter 4 for a short period of time (e.g. one second). When the isolated load is connected to load-connecting receptacle 10, current detecting unit 21 detects an extremely small amount of current. Accordingly, when current detecting unit 21 detects a current after the grid-connected operation is stopped, it is recognized that the isolated load is connected, and hence the operation of inverter 4 is just continued. When current detecting unit 21 does not detect a current, it is recognized that the isolated load is not connected, and hence the operation of inverter 4 is stopped. With such a configuration, power can automatically be supplied to the isolated load.

According to the configuration in the second embodiment, load-connecting receptacle 10 and plug 11 are integrated, and hence they can be easy to handle. When the grid-connected operation mode is terminated, and there is no need to insert plug 11 into household receptacle 13, for example, plug 11, which is not used, is accommodated in plug accommodating unit 33 so that plug 11 does not cause an obstruction.

Figure 4B:
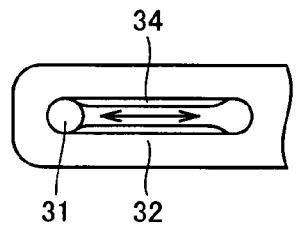
FIG. 4B is a partially enlarged view of the plug accommodating module provided at the inverter device according to the second embodiment of the present invention.

In the second embodiment, plug accommodating module 12 may have a configuration other than those shown in FIGS. 4A and 4B, and have any configuration allowing plug 11 to be bent for accommodation. Although plug accommodation detecting switch 35 is used as a configuration sensing that plug 11 is detected, the configuration is not limited thereto, as long as it can detect that the sensor or the like is accommodated.

As such, the embodiments of the present invention have been described. However, a configuration of the inverter device is not limited to the configurations shown in FIGS. 1-4.

In the embodiments of the present invention, the direct-current power supply is described as a solar battery. However, the direct-current power supply is not limited to a solar battery, and may be a fuel cell or the like, as long as it is a direct-current power supply.

It should be understood that all the embodiments disclosed here are by way of illustration and examples only and are not to be taken by way of limitation. It is intended that the scope of the present invention is indicated not by the description above, but by the appended claims, and that all the modifications that fall within the meaning and range of equivalents of the claims are embraced.

The invention claimed is:

1. An inverter device having two operation modes including a grid-connected operation mode where the inverter device is interconnected with a commercial power system, and an isolated operation mode where the inverter device is independent of said commercial power system and performs an isolated operation, comprising:
    an inverter unit converting direct-current power received from a direct-current power supply into alternating-current power;
    a control unit controlling an action of said inverter device;
    a grid-connected output terminal for outputting the alternating-current power converted by said inverter unit, said grid-connected output terminal being a plug connectable to a commercial receptacle, commercial power from the commercial power system being supplied to the commercial receptacle; and
    an isolated operation output terminal provided on a path of a power supply line connecting said inverter unit and said grid-connected output terminal, for outputting said alternating-current power, said isolated operation output terminal being a receptacle for connecting a load, the load being supplied with said alternating-current power.

2. The inverter device according to claim 1, further comprising a switch unit provided between said isolated operation output terminal and said grid-connected output terminal on the path of said power supply line, wherein
    said control unit brings said switch unit into a non-conduction state when said grid-connected operation mode is terminated.

3. The inverter device according to claim 2, further comprising a manipulation unit capable of transmitting to said control unit a signal for instructing a start of an operation of said inverter unit, wherein
    in a case where said control unit receives said signal from said manipulation unit in said isolated operation mode, when said switch unit is in the non-conduction state, said control unit permits the operation of said inverter unit.

4. The inverter device according to claim 2, further comprising a current detecting unit provided between said inverter unit and said isolated operation output terminal on the path of said power supply line, for detecting whether or not a current flows therebetween, wherein
    said control unit operates said inverter unit for a prescribed period of time when said control unit brings said switch unit into the non-conduction state, and said control unit continues an operation of said inverter unit when said current detecting unit detects that the current flows for said prescribed period of time.

5. The inverter device according to claim 1, further comprising a housing having said grid-connected output terminal and said isolated operation output terminal integrally provided therein, wherein
    said housing includes a plug accommodating unit capable of accommodating said grid-connected output terminal.

6. The inverter device according to claim 5, further comprising a manipulation unit capable of transmitting to said control unit a signal for instructing a start of an operation of said inverter unit, wherein
    said plug accommodating unit has a plug accommodation detecting unit detecting whether or not said grid-connected output terminal is accommodated in the plug accommodating unit, and
    in a case where said control unit receives said signal from said manipulation unit in said isolated operation mode, when said plug accommodation detecting unit detects that said grid-connected output terminal is accommodated in said plug accommodating unit, said control unit permits the operation of said inverter unit.

7. The inverter device according to claim 6, further comprising a current detecting unit provided between said inverter unit and said isolated operation output terminal on the path of said power supply line, for detecting whether or not a current flows therebetween, wherein
    said control unit operates said inverter unit for a prescribed period of time when said plug accommodation detecting unit detects that said grid-connected output terminal is accommodated in said plug accommodating unit, and said control unit continues the operation of said inverter unit when said current detecting unit detects that the current flows for said prescribed period of time.

8. An inverter device, comprising:
a power converting unit structured to convert direct-current power from a direct-current power supply into alternating-current power;
a load-connecting receptacle electrically connected to said power converting unit via a power supply line and structured to deliver said alternating-current power from said power converting unit to an isolated load when said isolated load is connected to said load-connecting receptacle;
a plug structured to be connectable into a household receptacle and structured to deliver said alternating-current power from said power converting unit to a commercial power system connected to said household receptacle and/or to a household load when said household load is connected to said household receptacle; and
an interconnection relay provided in a path of said power supply line between said load-connecting receptacle and said plug, wherein
when said interconnection relay is in a conduction state, said inverter device is in a grid-connected operation mode in which said alternating-current power from said power converting unit is available to both said load-connecting receptacle and said plug, and
when said interconnection relay is in a non-conduction state, said inverter device is in an isolated operation mode in which said alternating-current power from said power converting unit is available only to said load-connecting receptacle.

9. The inverter device according to claim 8, wherein said power converting unit comprises:
an inverter structured to receive said direct-current power from said direct-current power supply, convert said direct-current power into said alternating-current power, and output said alternating-current power; and
a control unit structured to control said interconnection relay to
put said interconnection relay into said conduction state when said inverter device is in said grid-connected operation mode, and
put said interconnection relay into non-conduction state when said inverter device is in said isolated operation mode.

10. The inverter device according to claim 9, wherein said control unit is structured to
receive a selection indicating whether said inverter device is to start in said grid-connected operation mode or in said isolated operation mode,
put said interconnection relay in said conduction state when said selection indicates that said inverter device is to start in said grid-connected operation mode, and
put said interconnection relay in said non-conduction state when said selection indicates that said inverter device is to start in said isolated operation mode.

11. The inverter device according to claim 10, wherein said selection is received as a signal from a remote controller.

12. The inverter device according to claim 10, wherein said control unit is structured to prevent said inverter from outputting said alternating-current power to said load-connecting receptacle until said interconnection relay is in said non-conduction state when said selection indicates that said inverter device is to start in said isolated operation mode.

13. The inverter device according to claim 9, wherein when said inverter device is in said grid-connected operation mode, said control unit is structured to determine whether a system voltage of said household receptacle is a normal system voltage,
put said interconnection relay into said conduction state when said system voltage is normal, and
put said interconnection relay into said non-conduction state when said system voltage is abnormal.

14. The inverter device according to claim 13, wherein said plug is structured to provide a signal indicative of said system voltage of said household receptacle to said control unit.

15. The inverter device according to claim 13, wherein when said system voltage is abnormal, said control unit is structured to
determine whether said isolated load is connected to said load-connecting receptacle,
control said inverter to output said alternating-current power to said load-connecting receptacle when said isolated load is connected, and
prevent said inverter from outputting said alternating-current power to said load-connecting receptacle when said isolated load is not connected.

16. The inverter device according to claim 15, wherein
said power converting unit further comprises a current detecting unit provided in a path between said inverter and said load-connecting receptacle, and
said control unit is structured to determine whether said isolated load is connected to said load-connecting receptacle by operating said inverter for a predetermined amount of time, and detecting whether there is current flow in said path between said inverter and said load-connecting receptacle when said inverter is operated.

17. The inverter device according to claim 9, wherein said power converting unit further comprises a protection relay provided in a path between said inverter and said load-connecting receptacle, wherein
when said protection relay is in a conduction state, said inverter and said load-connecting receptacle are electrically connected,
when said protection relay is in a non-conduction state, said inverter is electrically isolated from said load-connecting receptacle, and
said control unit structured to put said protection relay into said conduction state when said inverter device is in said grid-connected operation mode, and to put said interconnection relay into said non-conduction state when said inverter device is in said isolated operation mode.

18. An inverter device, comprising:
a power converting unit structured to convert direct-current power from a direct-current power supply into alternating-current power;
a plug accommodating module structured to be connectable to in which a load-connecting receptacle and a plug are integrated and electrically connected to each other therein on a common power supply line therein, in which
said load-connecting receptacle is structured to deliver said alternating-current power from said power converting unit to an isolated load when said isolated load is connected to said load-connecting receptacle, and
said plug is structured to be connectable into a household receptacle and structured to deliver said alternating-current power from said power converting unit to a commercial power system connected to said household receptacle and/or to a household load when said household load is connected to said household receptacle; and
an output relay provided in a path of said common power supply between said power converting unit and said plug accommodating unit, wherein when said output relay is in a conduction state, said inverter device is in a grid-connected operation mode in which said alternating-current power from power converting unit is available to both said load-connecting receptacle and said plug, and when said output relay is in a non-conduction state, said inverter device is in an isolated operation mode in which said alternating-current power from power converting unit is not available to both said load-connecting receptacle and said plug.

19. The inverter device according to claim 18, wherein said power converting unit comprises:

an inverter structured to receive said direct-current power from said direct-current power supply, convert said direct-current power into said alternating-current power, and output said alternating-current power to said load-connecting receptacle; and a control unit structured to control said output relay to put said output relay into said conduction state when said inverter device is in said grid-connected operation mode, and put said output relay into said non-conduction state when said inverter device is in said isolated operation mode.

20. The inverter device according to claim 19, wherein said control unit is structured to determine whether said plug is accommodated within said plug accommodating module so as to prevent electric shock to a user touching said plug, and prevent said inverter from outputting said alternating-current power to said load-connecting receptacle until said plug is accommodated therein.

* * * * *